United States Patent
Apel et al.

(10) Patent No.: US 6,518,753 B1
(45) Date of Patent: Feb. 11, 2003

(54) ANGLE OF ROTATION SENSOR HAVING A ROTATING ANNULAR MAGNET AND TWO FERRITIC STATOR HALVES

(75) Inventors: Peter Apel, Suedkirchen (DE); Marion Hauschopp, Werne (DE)

(73) Assignee: AB Eletronik GmbH, Werne (DE)

( * ) Notice: Subject to any disclaimer, the term of this patent is extended or adjusted under 35 U.S.C. 154(b) by 0 days.

(21) Appl. No.: 09/702,342

(22) Filed: Oct. 31, 2000

Related U.S. Application Data

(63) Continuation-in-part of application No. 09/101,913, filed on Dec. 14, 1998, now Pat. No. 6,194,894.

(30) Foreign Application Priority Data

| Dec. 4, 1996 | (DE) | 296 21 016 U |
| Dec. 4, 1996 | (DE) | 296 21 018 U |
| Jan. 23, 1997 | (DE) | 297 01 129 U |
| Dec. 3, 1997 | (WO) | PCT/EP97/06758 |

(51) Int. Cl.$^7$ ............ G01B 7/30; G01D 5/14
(52) U.S. Cl. ............ 324/207.25; 324/207.2
(58) Field of Search ............ 324/207.2, 207.21, 324/207.22, 207.25, 251, 252, 173, 174; 73/DIG. 3; 123/406.52, 406.58, 617; 29/595, 598; 310/42, 43, 68 B

(56) References Cited

U.S. PATENT DOCUMENTS

| 5,148,106 | A | * | 9/1992 | Ozawa | 324/207.21 |
| 5,332,965 | A | * | 7/1994 | Wolf et al. | 324/207.2 X |
| 5,544,000 | A | * | 8/1996 | Suzuki et al. | 324/207.2 X |
| 5,861,745 | A | * | 1/1999 | Herden | 324/207.2 |
| 6,043,645 | A | * | 3/2000 | Oudet et al. | 324/207.2 |
| 6,194,894 | B1 | * | 2/2001 | Apel et al. | 324/207.25 |

* cited by examiner

*Primary Examiner*—Gerard R. Strecker
(74) *Attorney, Agent, or Firm*—Milde & Hoffberg, LLP

(57) ABSTRACT

To make it possible for a rotation angle sensor to be manufactured and assembled more easily and more accurately, the part components of a stator element (21) made of a ferritic material are held in a sintered stator body, made by a sintering technique, by at least one holding element in a holding recess of a base element made of a non-magnetizable material. A magnetic holding device (26, 27) is a holding element made by a metal injection molding (MIM) technique with an at least partly formed magnetic isolation zone and at least one recess. An annular magnetic element (24) is attached inside the MIM holding device by means of at least one slit-shaped recess and at least one compatible linking element, and positioned at a given angle α in relation to a gap, between the sintered stator bodies.

15 Claims, 6 Drawing Sheets

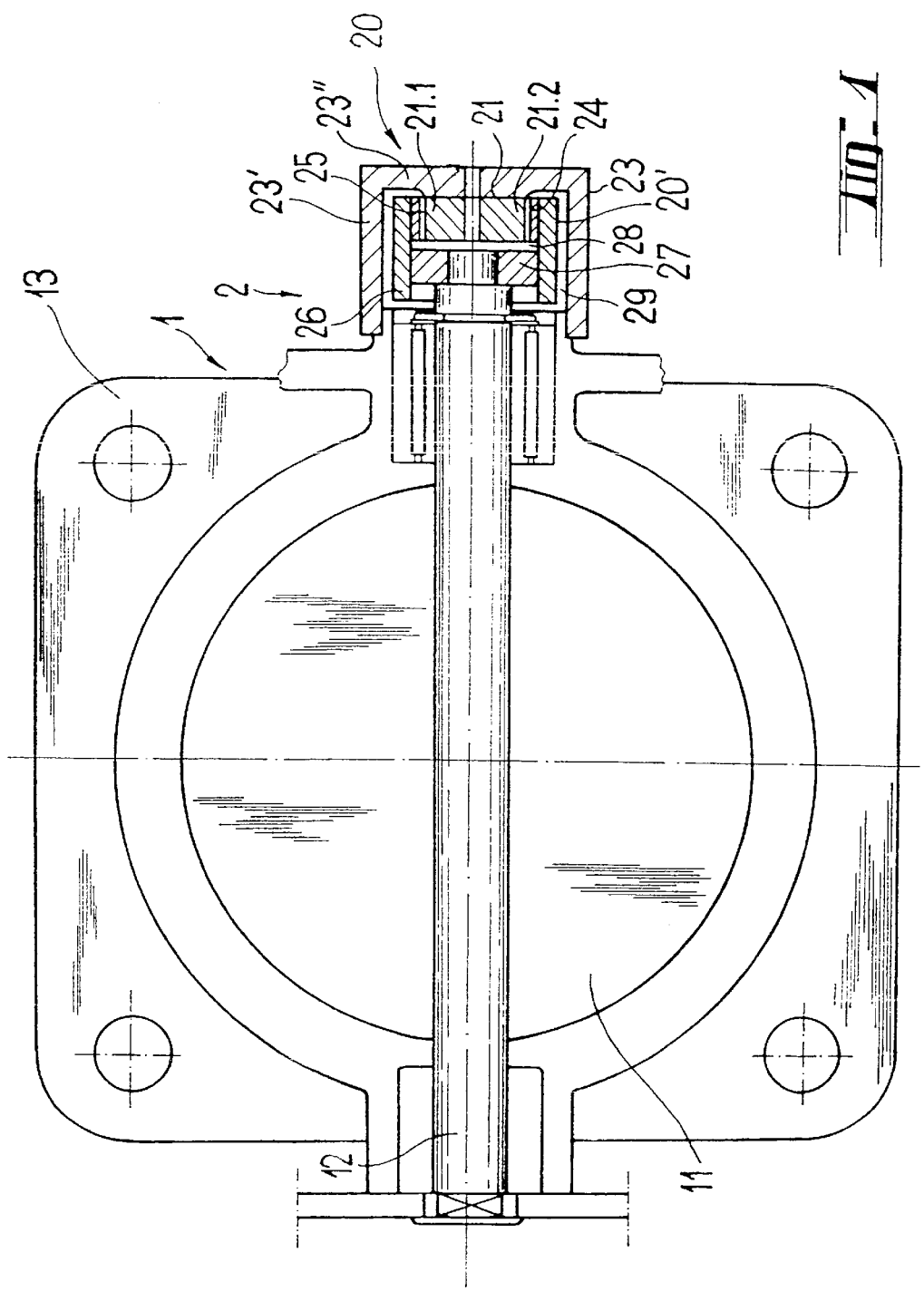

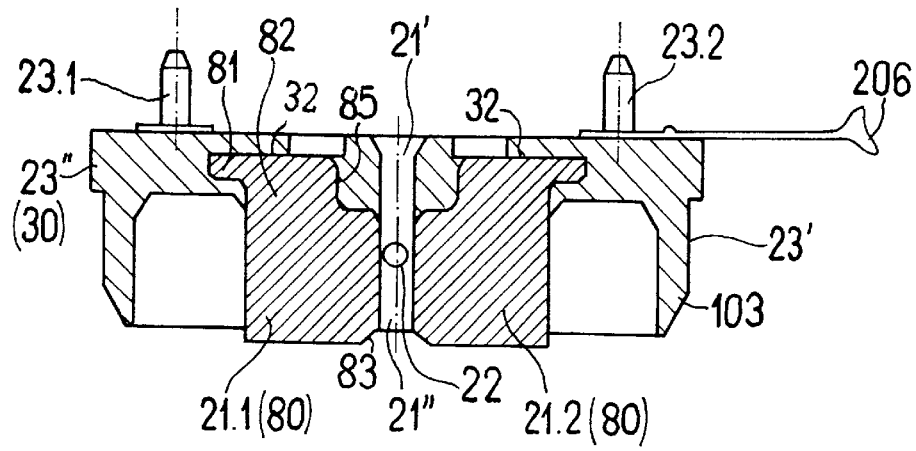
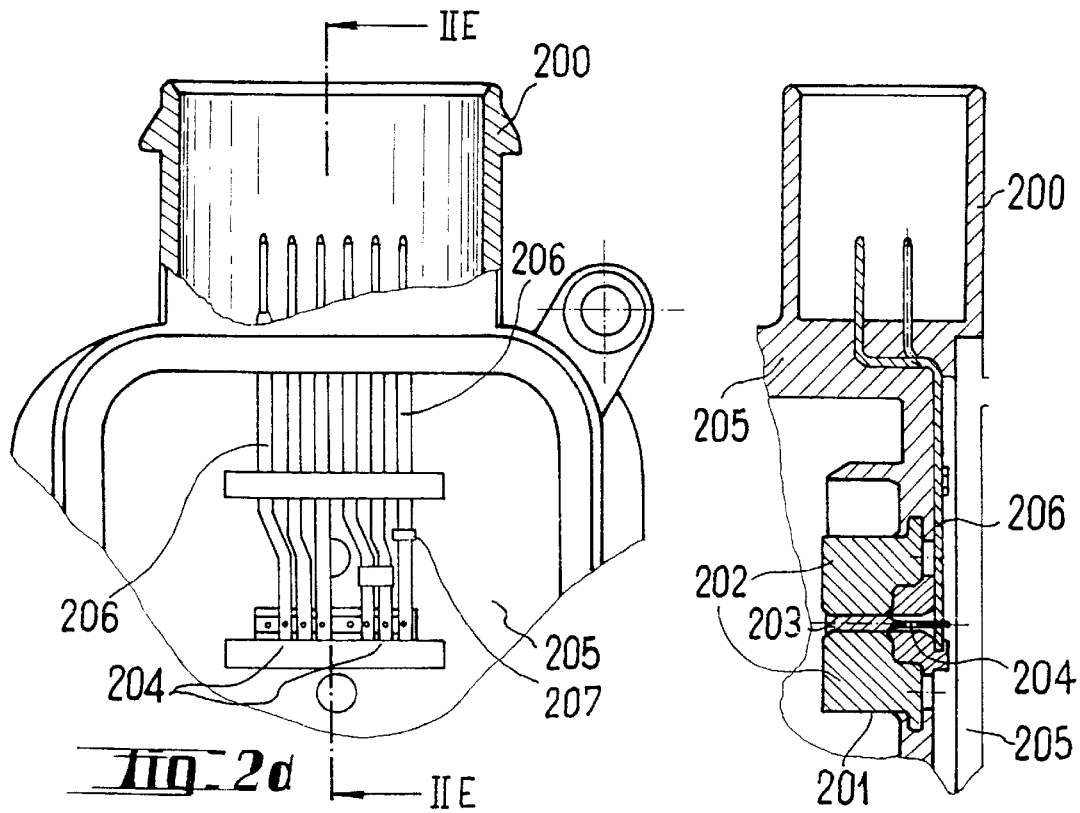

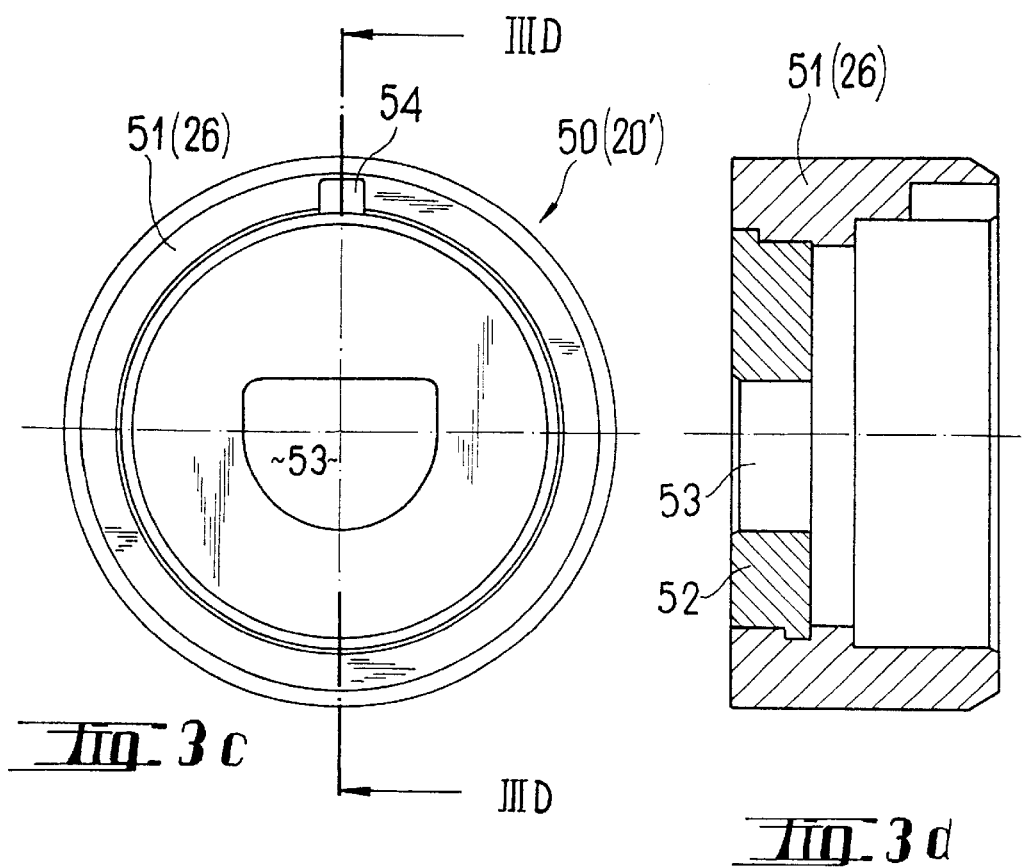

US 6,518,753 B1

ANGLE OF ROTATION SENSOR HAVING A ROTATING ANNULAR MAGNET AND TWO FERRITIC STATOR HALVES

CROSS-REFERENCE TO RELATED APPLICATION

This application is a continuation-in-part application of application Ser. No. 09/101,913 filed Dec. 14, 1998, now U.S. Pat. No. 6,194,894.

BACKGROUND OF THE INVENTION

The present invention concerns an angle-of-rotation sensor with a stationary component and a rotating component. The stationary component includes a stator accommodated in a housing with at least one base. The stator is in two halves of ferritic material separated by space. The rotating component includes an annular magnet accommodated in a holder and rotating around the stator with an airgap left between them.

An angle-of-rotation sensor of this genus is known from the WIPO Patent Publication No. WO A 95/14911, which is assigned to the present applicant. It comprises a stationary component and a rotating component that moves in relation to it. The stationary component has two mutually facing stator halves with space between them.

The rotating component includes an annular magnet accommodated in a holder.

There are drawbacks to this embodiment. The connections to other parts of the device or the vehicle engine are difficult to perform, because the poles of the magnet are difficult to position properly with respect to the space between the stator halves while the sensor is being assembled.

SUMMARY OF THE INVENTION

The principal object of the present invention is accordingly to provide a more accurate angle-of-rotation sensor of the aforesaid genus that will be easer to manufacture and assemble. The stationary component in particular will be simpler, the magnet holder as magnetically insulating as possible. The assembly and connection of the sensor should be easily made. This object is attained as recited in the body of Claim 1.

This object, as well as other objects which will become apparent from the discussion that follows, are achieved, in accordance with the present invention, in an angle of rotation sensor of the type described above, by the following features:

(a) the ferritic stator halves are stator halves, with at least one holder secured in or on a baseplate of non-magnetic material;

(b) the magnet is positioned in the holder by at least one cut-out gap and at least one matching web at a specified angle α to the space; and (c) the baseplate is connected to at least one conductor that connects at least one component and at least one coupler.

Stators are easy to sinter, precise and stable. The complicated stacking procedure is eliminated. One particular advantage is that each sintered stator half can be fastened to the baseplate extremely accurately. The magnet holder can be cost effectively and, in particular, precisely fabricated by metal-injection molding (MIM). Complicated additional shaping, especially machining, of the material is unnecessary. The holder will hold the magnet exactly where it should be within precises tolerances. Measurements will be considerably more precise. The web or space will simultaneously position the magnet precisely in relation to the space during assembly. No complicated readjustments will be necessary. It will accordingly be possible to position the magnet's pole at a right angle, perpendicular that is, to the space between the two facing stator halves. If any angle other than a right angle is needed in special cases, it can be established ahead of time for all the angle-of-rotation sensors in the same series. Most significant, however, is that the magnet will be secured too tight to turn. Two alternative embodiments of the stator holders are possible. They can be either sintered bolts or sintered feet. Whether bolts or feet, they can terminate in a sintered cap. This feature ensures that the sintered stator half is secured, stationary, in the baseplate. The baseplate can be a stator baseplate with at least one stabilising cutout.

The stator baseplate can comprise the base of the stationary component housing and have stabilising cutouts with sintered stator halves fitting into it along with their feet and caps.

The stator baseplate can be plastic or other non-magnetic and non-conductive materials.

The halves can be sintered to final dimension, finally positioned, and forced into the base of the housing as a whole. The essential advantage of this approach is the extremely cost-effective stabilisation and fastening of the halves. The stationary component can accordingly be finally fabricated in only two basic steps.

The housing and its base can be of plastic, preferably injection-molded to ensure that the stationary component constitutes a precisely dimensioned component of the sensor.

Two alternative embodiments of the metal-injection molded holder are possible.

It can be a cup metal-injection molded in one piece of magnetic material with an essentially round foot, at least two, preferably cylindrical stems rising out of one edge of the foot, and an essentially round and hollow bowl resting on the stems. A one-piece bowl is considerably less expensive to manufacture. Such a cup can be molded of magnetic material in a single mold. The molding will be 30 percent oversize and will need to be heated and sintered to its final dimensions.

To allow at least extensive magnetic insulation of the cup from the components to be mounted on it, the stems can magnetically insulate the foot from the bowl.

The holder can alternatively be metal-injection molded in two parts, comprising an essentially straight-sided bowl with a round base of metal-injection molded of a non-magnetic material, provided in a second molding stage with a cylindrical wall of magnetic material. The resulting bimaterial molding will be 30 percent oversize and will need to be more or less sintered to its final dimensions. The base and wall will accordingly be precisely dimensioned and will fit together perfectly tightly. The wall will be precisely positioned. The non-magnetic material of the base will ensure effective magnetic insulation from any components to be mounted on the bowl. One particular advantage is that the base of the bowl can be provided with a cutout that will readily accommodate a simply inserted valve shaft. This feature will compensate for the extra expense of two-part manufacture.

A gap can be cut out of the bowl in either embodiment. If the magnetic wall is provided with at least one matching web, the poles of the wall can be positioned at a right angle, perpendicular that is, to the space between the mutually facing stator halves. If, in a special case, the angle is to be other than a right angle, it can be a cup-like body established for all the products in a single series.

The Hall sensor or sensors and the plug unit can be connected by a stamped lead frame. The lead frame can be held within the housing unit.

BRIEF DESCRIPTION OF THE DRAWINGS

FIG. 1 is a schematic partly sectional view of a angle-of-rotation sensor coupled to a throttle valve.

FIG. 2b is a section along the line IIB—IIB through the stationary component illustrated in FIG. 2a.

FIG. 2c is a section along the line IIB—IIB through the stationary component illustrated in FIG. 2a wherein the housing is variable.

FIG. 2d is another embodiment of the angle of rotation sensor with a Hall sensor system, provided with a conductor grid or lead frame.

FIG. 2e is a section along the line IIE–IIE of FIG. 2d through a rotation sensor with a hall sensor.

FIG. 3b is a section along the line IIIB–III through the magnet holder illustrated in FIG. 3a.

FIG. 3c illustrates another embodiment of a magnet holder for the rotating component of the angle-of-rotation sensor illustrated in FIG. 1.

FIG. 3d is a section along the line IIID—IIID through the magnet holder illustrated in FIG. 3c.

DESCRIPTION OF THE PREFERRED EMBODIMENTS

Figure 2A:
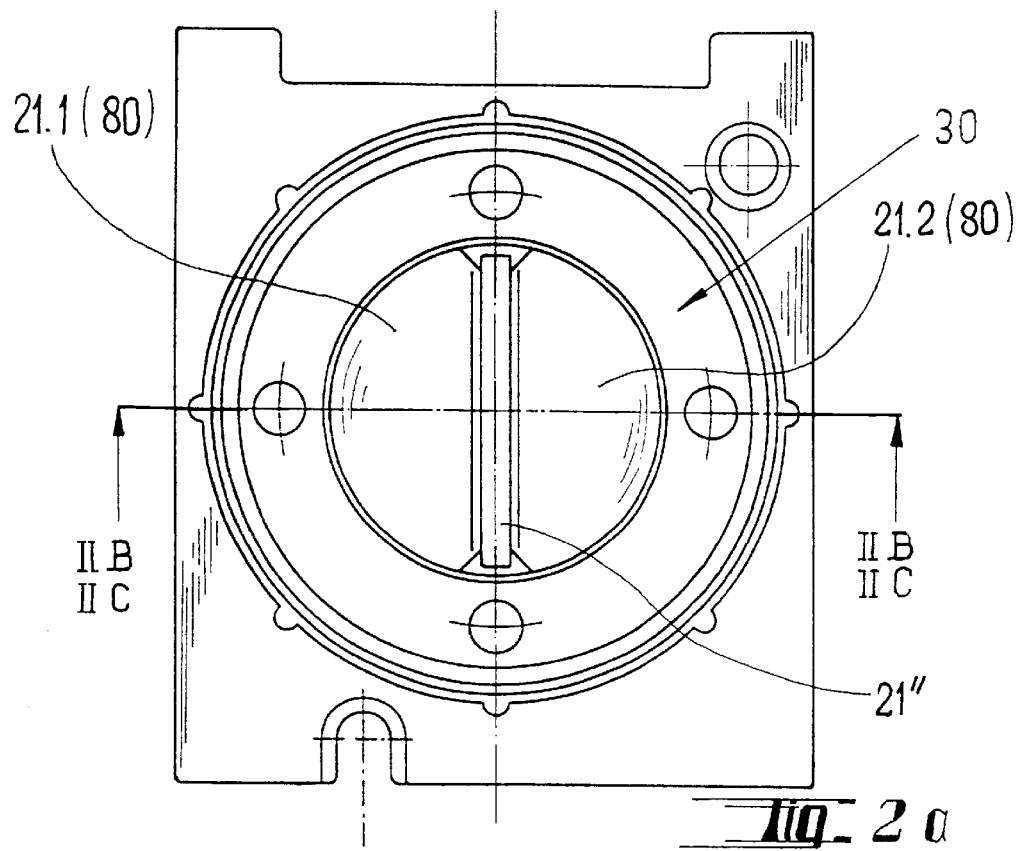
FIG. 2a is a schematic top view of the stationary component of the angle-of-rotation sensor illustrated in FIG. 1.

The preferred embodiments of the present invention will now be described with reference to FIGS. 1–4 of the drawings. Identical elements in the various figures are designated with the same reference numerals.

Figure 2B:
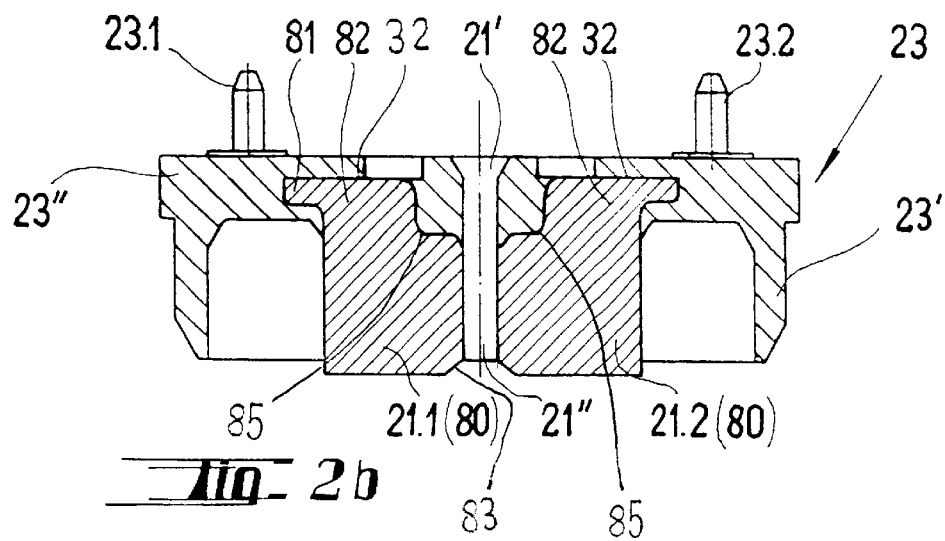

The angle-of-rotation sensor 2 illustrated in FIG. 1 has a stationary component 20 comprising a stator 21 accommodated in a housing 23. Stator 21 is composed of two stator halves 21.1 and 21.2. Stator halves 21.1 and 21.2 are shaped like orange segments and separated by a space 21" (FIGS. 2a and 2b). Their points are beveled, preferably 45°, at the end of space 21". Housing 23 has a base 23" and a cylindrical wall 23'.

As will be evident from FIG. 1, stationary component 20 is confronted by a rotating component 20'. Rotating component 20' includes an annular magnet 24 accommodated in a holder comprising a magnet-securing component 26 to concentrate the magnetic flux and to form a magnetic circuit with a disk-shaped spacer 27. Spacer 27 is directly connected to a throttle valve shaft 12. Spacer 27 and stator 21.1 and 21.2 are separated, once sensor housing 23 has been secured to a housing 13, by a gap 28 and rotation angle apparatus 1 in FIG. 1. Cylindrical wall 23' and magnet-securing component 26 are separated by another gap 29. Magnet-securing component 26 and the annular magnet 24 accommodated therein accordingly constitute in conjunction with spacer 27 a rotor component that can rotate protected inside sensor housing 23.

Once the individual components of rotating component 20' have been properly adjusted and aligned in relation to throttle valve shaft 12, sensor housing 23 is thrust over the magnet-securing component 26 along with stator halves 21.1 and 21.2 and a Hall-effect component is accommodated in the space 21", leaving an airgap 25 and gaps 28 and 29. Sensor housing 23 is then fastened by its cylindrical wall 23' to valve housing 13. If the joint between sensor housing 23 and valve housing 13 needs to be sealed, sensor housing 23 will also act as a protective jacket. The whole angle-of-rotation sensor 2 will accordingly be protected against such external conditions as the very high heat in an engine compartment and the effects of oil, water, etc.

FIGS. 2a and 2b illustrate one embodiment of the stationary component 20 in angle-of-rotation sensor 2. The stator halves 21.1 and 21.2 are sintered stator halves 80, individually metal-injection molded of a ferritic material and sintered. Since halves 80 are of the same shape, they can be fabricated continuously and sintered synchronized in batches in a furnace. Each accordingly fabricated sintered stator half 80 will be provided with a foot 82 that merges into a cap 81 which is secured in a stabilising cutout 32 in the baseplate 23" of non-magnetic material, and with a shoulder 85.

In FIG. 2c, optionally the housing 23 can be injection molded of non-conducting plastic 103 with conductors to connect component parts and couplers (not shown). Additionally, the housing 23 optionally has a stamped lead frame 206.

FIGS. 2d and 2e show an embodiment for the angle of rotation sensor relating to a butterfly valve control device, and a stator unit 201 having two stator partial elements 202. Each stator partial element is arranged with respect to one other with a space 203 between them. At least one Hall sensor 204 is held in the space 203. A rotor unit (not shown) with at least one magnetic element (not shown) is moveable with respect to the stator unit 201. A plug unit 200 and a housing unit 205 holding at least one stator unit 201, are also shown. The Hall sensor 204 and the plug unit 200 are connected by a stamped metal grid or lead frame conductors 206. The stamped grid or lead frame 206 is held within the housing unit 205. The electrical connection between the Hall sensor contact and lead frame 206 can be effected by welding, bonding, soldering or crimping (BORDELN). Further components 207 may be fastened directly to certain conductors. These components are, e.g., resistors, capacitors and/or integrated circuits.

Figure 4:
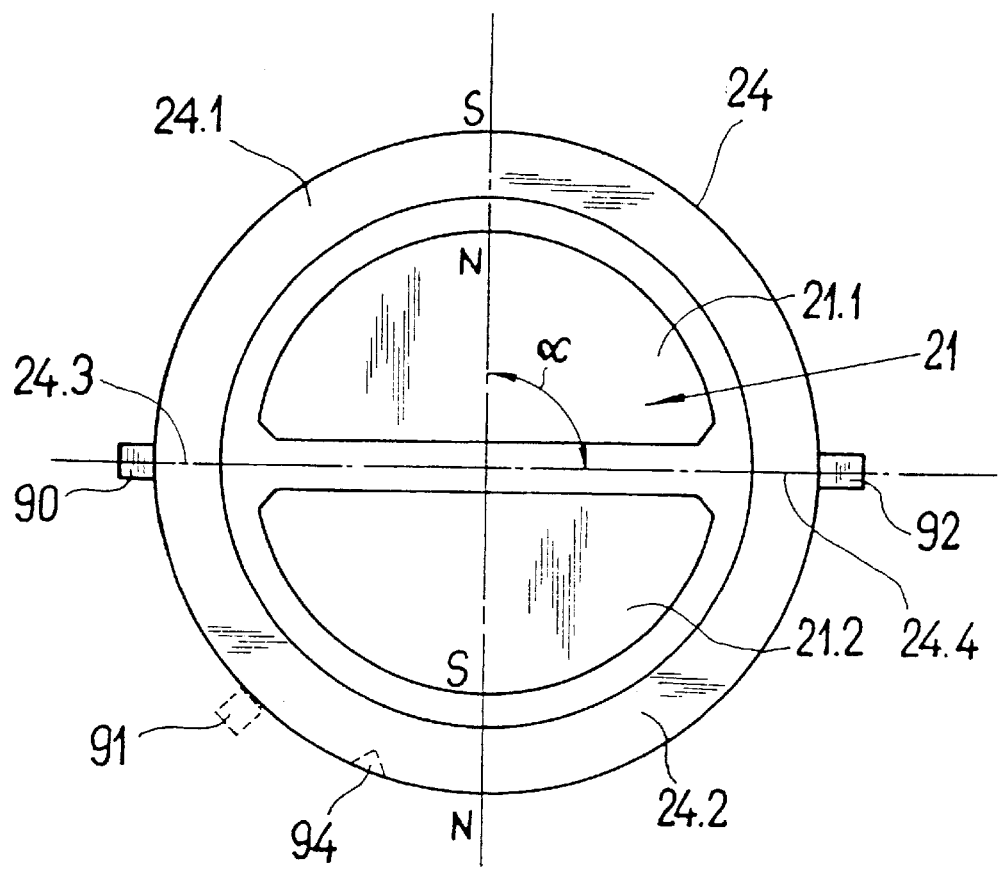
FIG. 4 is a schematic top view of the space inside the stator in the adjustable magnet in the angle-of-rotation sensor illustrated in FIG. 1.

As shown in FIGS. 2a, 2b and 4, each sintered stator half 80 will have a longitudinal bevel 83 of 45°. Two such sintered stator halves 80 can be accommodated in a single mold separated by a space 21", acting as a baseplate in base 23" while the plastic sensor housing 23 is being molded. This procedure leaves stabilizing cutouts 52 (32) in base 23" to accommodate feet 82. Caps 81 are also secured in base 23". Stator halves 21.1 and 21.2 are both surrounded by cylindrical wall 23' when sensor housing 23 is molded. Stabilizing components or prongs 23.1 and 23.2 each act to stabilize the apparatus by allowing the apparatus to affix itself to another member having a corresponding female opening, while female opening 21' (FIG. 2b and 2c) also allows the apparatus to be affixed, by a corresponding male attachment or prong.

The particular advantage of such a stationary component 20 is that both sensor housing 23 and holders for stator halves 21.1 and 21.2 in the form of sintered stator halves 80 can simultaneously be produced in a separate molding process, considerably decreasing manufacturing costs and keeping the height of stationary component 20 to a minimum.

Another advantage is that Hall-effect component 22 can be positioned in the vicinity of the densest magnetic flux near the parallel and facing surfaces of sintered stator halves 80, while longitudinal bevels 83 concentrate the flux. The enlarged space between the two sintered stator halves 80 between the facing feet 82 in the vicinity of space 21" keeps the flux less dense. The transverse bevels 84 balance the flow at the orange-segment shaped stator halves due to the absence of edges.

Figure 3A:
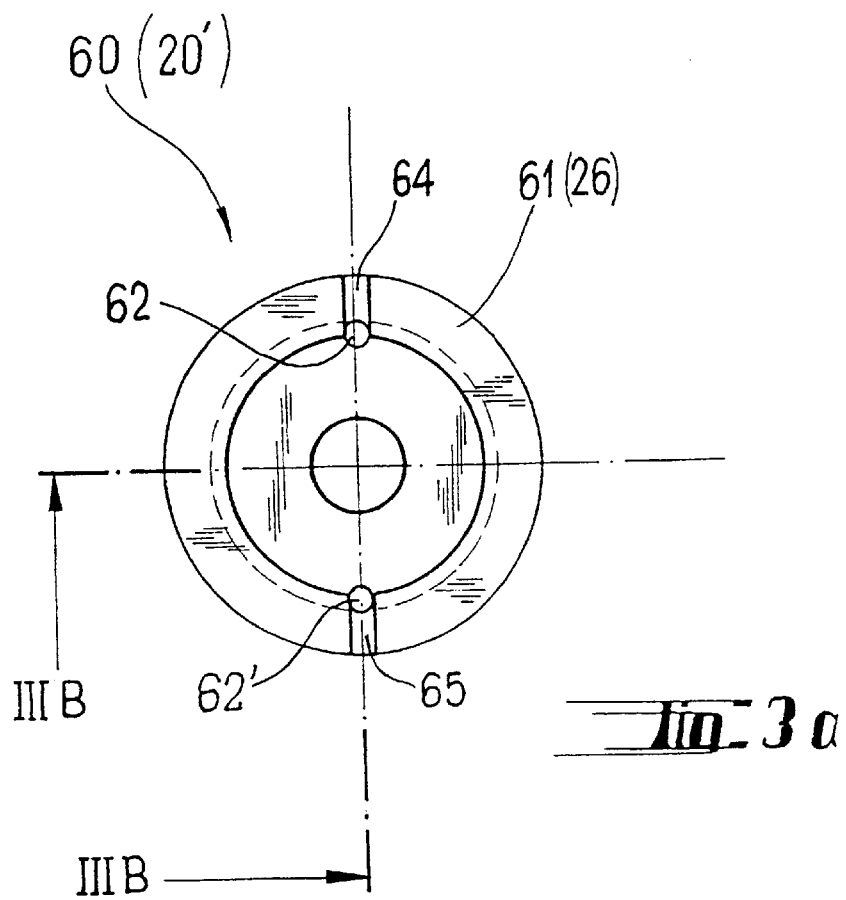
FIG. 3a illustrates a magnet holder for the rotating component in the angle-of-rotation sensor illustrated in FIG. 1.
Figure 3B:
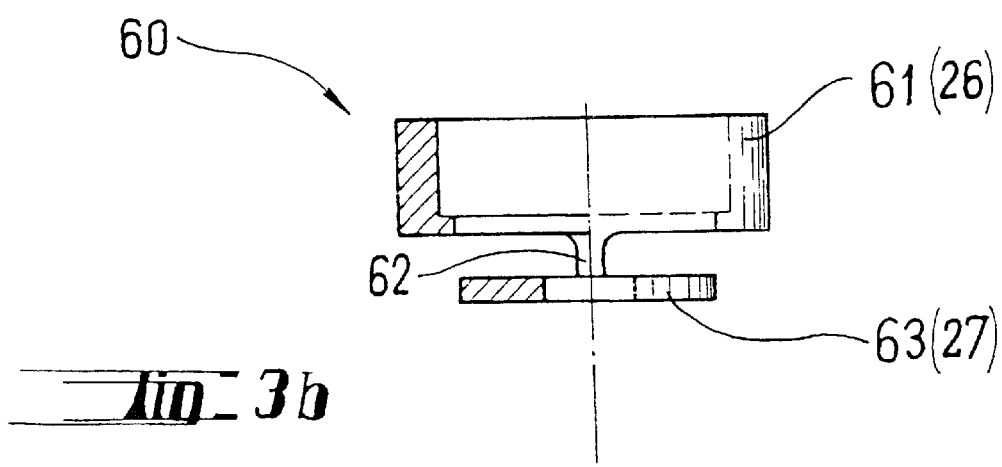

FIGS. 3a and 3b illustrate a magnet-securing component 26, in this case bowl 61, which together with disk-shaped foot 63 and two stems 62 and 62' constitute the entire cup.

Cup 60 consists of a disk-shaped foot 63 with two stems 62 and 62' extending out of it and supporting a bowl 61.

Mutually facing gaps 64 and 65 have been cut out of bowl 61.

According to the present invention cup 60 is preferably metalinjection molded of a magnetic material in the form of X12CrMo17Si steel. This steel does not corrode and is injected into a mold. The molding is heated in a furnace in a process similar to sintering, reducing the volume of the cup by 30% to its final dimensions.

The bowl 61 in this embodiment constitutes magnet-securing component 26, and foot 63 spacer 27. Stems 62 and 62' connect magnet-securing component 26 to spacer 27 and at least extensively insulate them magnetically from each other.

FIG. 3c and 3d illustrate another embodiment of a magnet holder in the form of magnet securing component 26, in this case cylindrical wall 51 of metal-injection molded and sintered bowl 50. The bowl 50, which is rotating component 20', has cutout 53 and cutout gap 54.

Bow 30 is metal-injection molded in two parts. Its non-magnetic base 52 is molded of X2CrNi1911 steel along with such additives as wax. A cylindrical wall of powdered X12CrNiSi7 steel is then injected around it, also combined with such additives as wax in another mold.

The resulting metal-injection molded blank is then at least partly washed free of the additives, especially the wax, and "baked" at approximately 1000° C. down to its final dimensions, approximately 30 percent of its original dimensions, in a process similar to sintering.

Although metal-injection molding (MIM) is in itself known, using it to fabricate parts like the two embodiments of a magnet holder specified herein is not.

As specified hereinbefore with reference to FIG. 1 angle-of-rotation sensor 2 has a component 20' in the form of an annular magnet 24 that rotates around stationary component 20.

In FIG. 4, mutually facing webs 90 and 92, which position the magnet precisely in relation to the space during assembly, can be made of the same material as the magnetic component they are mounted on, or of plastic, and are here mounted on annular magnet 24, which comprises north-south segment 24.1 and south-north segment 24.2. The interior of one segment is north-poled and its exterior south-poled, the interior of the other is south-poled and its exterior north-poled. The overall magnet is accordingly radially two-poled and acts like a bar magnet. The magnet flux is radial in the areas labeled N and S. The only field irregularities are at interfaces 24.3 and 24.4, and the webs are situated in those magnetically neutral regions. The device may on the other hand have only one web 90 or even several webs 91. Annular magnet 24 can also be provided with a cut-out gap 94, which aids in stabilization.

The radially two-pole annular magnet 24 must be positioned at a specified angle α, 90° in the illustrated embodiment, to the two mutually facing halves 21.1 and 21.2 of stator 21, which are hereintofore specified, are in the form of fixed sintered stator halves 80.

In FIG. 4, one of the webs is utilized to establish annular magnet 24 in the gap 54 cut out of bowl 50 at angle α (FIG. 3a).

Additionally in FIG. 4, both webs 90 and 92 are utilized to establish annular magnet 24 in cut-out gaps 64 and 65 at angle α (FIG. 3a).

It should be emphasized that the webs and matching cut-out gaps allow simple and extremely precise positioning of annular magnet 24. No complicated re-adjustments are necessary. It is essential to the present invention that annular magnet 24 cannot turn inside base 52 or wall 51. Even the most powerful forces cannot displace or remove the magnet.

There has thus been shown and described a novel rotation angle sensor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an angle-of-rotation sensor with a stationary component and a rotating component, wherein the stationary component includes a stator, the stator is in two halves of ferritic material separated by space, and the rotating component includes an annular magnet accommodated in a magnet holder rotating around the stator with an airgap between them, the improvement wherein each stator half is held on a baseplate of non-magnetic material, and wherein the baseplate is provided with at least one conductor that connects at least one Hall sensor and at least one coupler member.

2. Angle-of-rotation sensor defined in claim 1, wherein said at least one conductor are formed by a lead frame.

3. Angle-of-rotation sensor defined in claim 1, wherein the lead frame carries further components.

4. Angle-of-rotation sensor as defined in claim 1, wherein the stator halves are sintered.

5. Angle-of-rotation sensor defined in claim 1, wherein the baseplate forms the base of a housing of the stationary component housing and has stabilizing cutouts with stator halves fitting into it.

6. Angle-of-rotation sensor defined in claim 4, wherein the holder is a cup which is metal-injection molded in one piece of magnetic material with an essentially round foot, a magnetically insulating section in the form of at least two stems rising out of one edge of the foot, and an essentially round and hollow bowl resting on the stems.

7. Angle-of-rotation sensor as defined in claim 4, wherein the holder is metal-injection molded in two parts, comprising an essentially straight-sided bowl with a magnetically insulating section in the form of a round base metal-injection molded of a non-magnetic material with a cylindrical wall of magnetic material around it.

8. Angle-of-rotation sensor defined in claim 5, wherein the base of the housing is of plastic.

9. Angle-of-rotation sensor defined in claim 7, wherein the magnetic material employed for the wall is a ferrite that includes at least chrome and nickel.

10. Angle-of-rotation sensor as defined in claim 7, wherein the non-magnetic material is X2CrNi1911 steel.

11. Angle-of-rotation sensor or defined in claim 1, said sensor is used for a butterfly valve control system, said sensor comprising:

(a) a stator with at least two stator partial elements, said stator partial elements having a space between them;

(b) at least one Hall sensor disposed in said space;

(c) at least one rotor unit having at least one magnetic element which is movable with respect to said stator;

(d) at least one plug unit including at least one coupler member; and (e) at least one housing unit which holds said stator; wherein said Hall sensor and said plug unit are connected by a stamped lead frame, and said stamped lead frame is held in said housing unit.

12. Angle-of-rotation sensor as defined in claim 7, wherein said ferrite is X12CrNiSi7 steel.

13. Angle-of-rotation sensor as defined in claim 8, wherein said housing is of injection-molded plastic.

14. Angle-of-rotation sensor as defined in claim 6, wherein said stems are cylindrical.

15. Angle-of-rotation sensor as defined in claim 5, wherein the stator halves are scintered.

* * * * *